United States Patent [19]

Nakano et al.

[11] Patent Number: 5,197,063

[45] Date of Patent: Mar. 23, 1993

[54] CIRCUIT SWITCHING METHOD AND APPARATUS FOR TIME DIVISION NETWORK WITH VARIOUS TRANSMISSION SPEEDS

[75] Inventors: Yukio Nakano, Hachioji; Tadayuki Kanno, Yokohama; Masahiro Takatori, Kokubunji; Hiromi Ueda, Yokohama, all of Japan

[73] Assignees: Hitachi, Ltd.; Nippon Telegraph and Telephone Corporation, both of Tokyo, Japan

[21] Appl. No.: 641,928

[22] Filed: Jan. 16, 1991

[30] Foreign Application Priority Data

Jan. 19, 1990 [JP] Japan ................................. 2-008120

[51] Int. Cl.$^5$ ............................................. H04Q 11/04
[52] U.S. Cl. ................................... 370/58.1; 370/65.5
[58] Field of Search ................ 370/16, 58.1, 84, 60, 370/59, 61, 63; 178/3

[56] References Cited

U.S. PATENT DOCUMENTS

| | | | |
|---|---|---|---|
| 3,692,942 | 9/1972 | Inose et al. ........................ | 370/95.1 |
| 4,144,407 | 2/1979 | Zaffignani ........................ | 370/16 |
| 4,241,802 | 12/1980 | Bergman ........................ | 178/3 |
| 4,710,916 | 12/1987 | Amstutz ........................ | 370/58.1 |
| 4,916,693 | 4/1990 | Shimada ........................ | 370/84 |

*Primary Examiner*—Douglas W. Olms
*Assistant Examiner*—T. Samuel
*Attorney, Agent, or Firm*—Antonelli, Terry, Stout & Kraus

[57] ABSTRACT

A circuit switching apparatus and method for time division network with various transmission speeds for time-division multiplexing a plurality of circuits including signals at different transmission speeds, transmitting the same onto an input highway, repeatedly recording the transmitted signals in a data memory in a predetermined order, reading respective recorded signals in a predetermined order onto an output highway. An access unit for reading signals from the data memory has an address control memory for storing circuit switching information, a circuit speed control memory for storing transmission speed information for the respective circuits and an address generating section for generating an address for accessing the data memory on the basis of the circuit switching information and the circuit transmission speed information from those memories.

9 Claims, 19 Drawing Sheets

FIG. 5A

| OUTPUT OF CIRCUIT SPEED CONTROL MEMORY 100 | | | OUTPUT OF ADDRESS CONTROL MEMORY 101 | | |
|---|---|---|---|---|---|
| | 5-1 | | 5-2-1 | | 5-2-2 |
| TUG-2T# | | ADDRESS | TUG-2T#1 | ADDRESS | TUG-2T#2 |
| TS#1 | (TU-11) | 0 | 6(TUG-2T#1,TU-11#4) | 0 | |
| TS#2 | (TU-12) | 1 | | 1 | 5(TUG-2T#2,TU-12#3) |
| TS#3 | (TU-11) | 2 | 4(TUG-2T#1,TU-11#3) | 2 | |
| TS#4 | (TU-12) | 3 | | 3 | 1(TUG-2T#2,TU-12#1) |
| TS#5 | (TU-11) | 4 | 0(TUG-2T#1,TU-11#1) | 4 | |
| TS#6 | (TU-12) | 5 | | 5 | 3(TUG-2T#2,TU-12#2) |
| TS#7 | (TU-11) | 6 | 2(TUG-2T#1,TU-11#2) | 0 | |
| TS#8 | (TU-12) | 7 | | 1 | 5(TUG-2T#2,TU-12#3) |
| TS#9 | (TU-11) | 0 | 6(TUG-2T#1,TU-11#4) | 2 | |
| | (TU-12) | 1 | | 3 | 1(TUG-2T#2,TU-12#1) |
| | (TU-11) | 2 | 4(TUG-2T#1,TU-11#3) | 4 | |
| | (TU-12) | 3 | | 5 | 3(TUG-2T#2,TU-12#2) |
| | (TU-11) | 4 | 0(TUG-2T#1,TU-11#1) | 0 | |
| | (TU-12) | 5 | | 1 | 5(TUG-2T#2,TU-12#3) |
| | (TU-11) | 6 | 2(TUG-2T#1,TU-11#2) | 2 | |
| | (TU-12) | 7 | | 3 | 1(TUG-2T#2,TU-12#1) |
| | (TU-11) | 0 | 6(TUG-2T#1,TU-11#4) | 4 | |
| | (TU-12) | 1 | | 5 | 3(TUG-2T#2,TU-12#2) |
| | (TU-11) | 2 | 4(TUG-2T#1,TU-11#3) | 0 | |
| | (TU-12) | 3 | | 1 | 5(TUG-2T#2,TU-12#3) |
| | (TU-11) | 4 | 0(TUG-2T#1,TU-11#1) | 2 | |
| | (TU-12) | 5 | | 3 | 1(TUG-2T#2,TU-12#1) |
| | (TU-11) | 6 | 2(TUG-2T#1,TU-11#2) | 4 | |
| TS#24 | (TU-12) | 7 | | 5 | 3(TUG-2T#2,TU-12#2) |

OUTPUT OF COUNTER 400A

OUTPUT OF COUNTER 401A

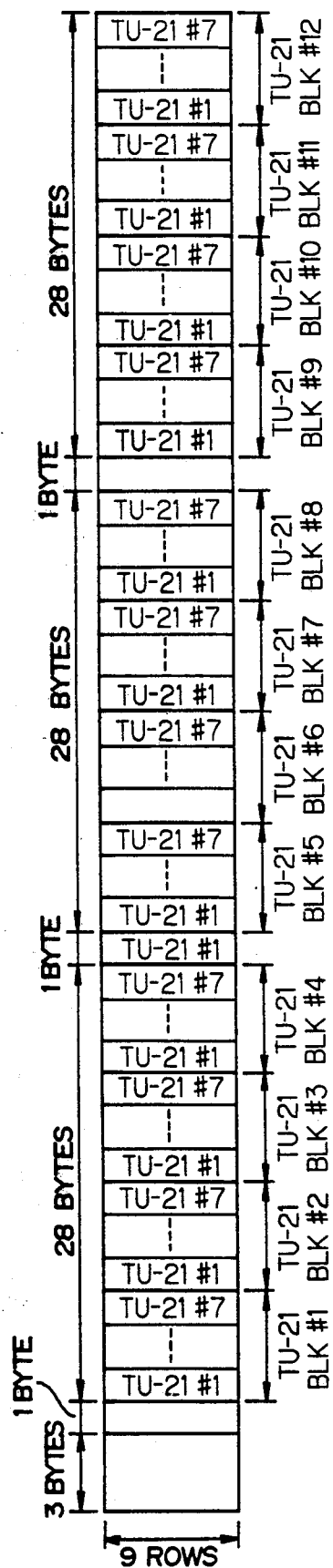
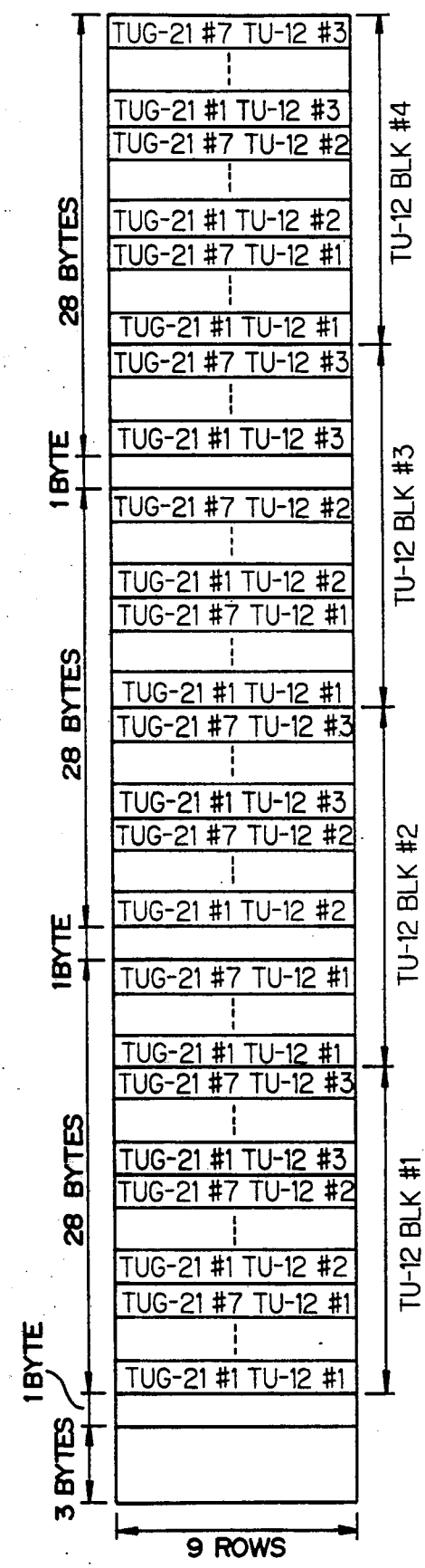
FIG. 6A IN CASE OF TU-21
FIG. 6B IN CASE OF TU-12

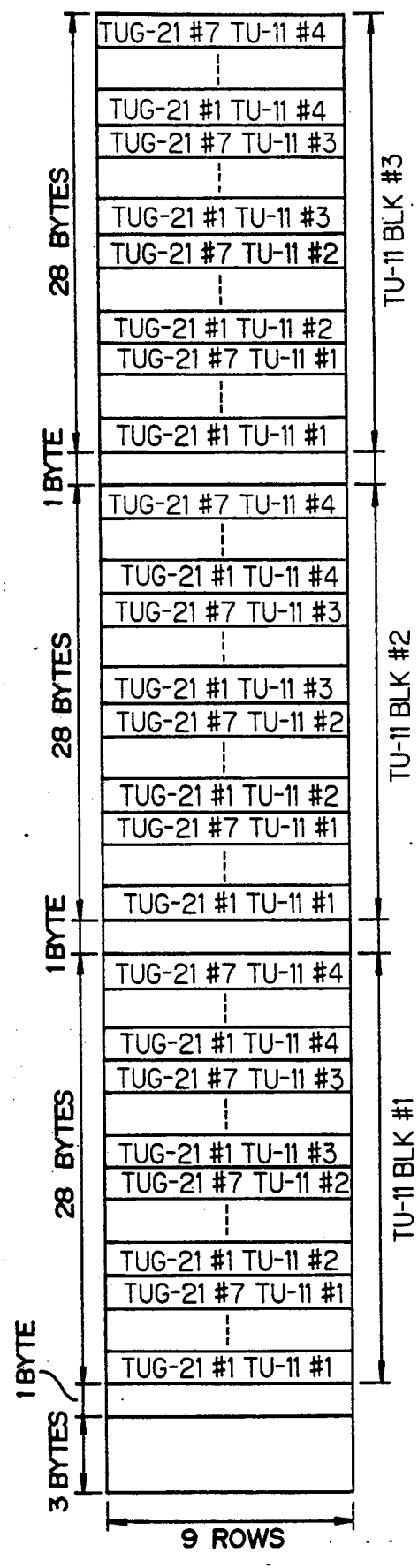
FIG. 6C  IN CASE OF TU-11

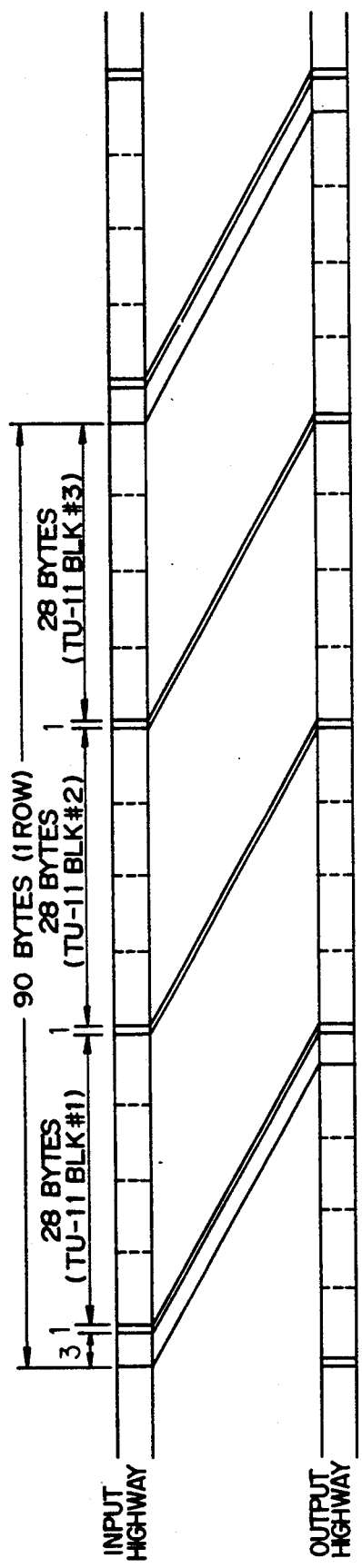
FIG. 7A IN CASE OF TU-11 (1.5M)
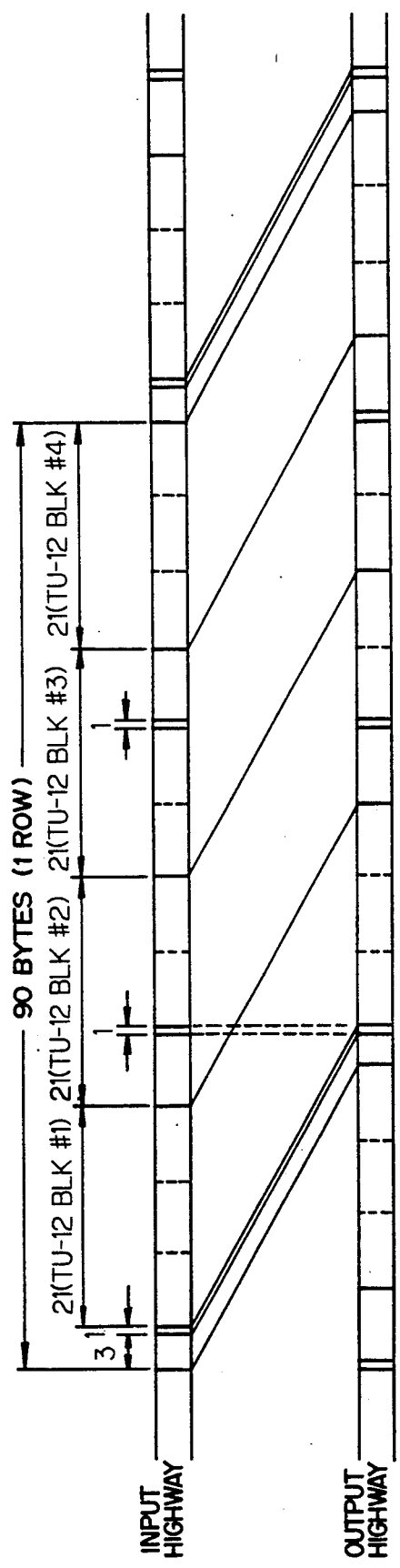
FIG. 7B IN CASE OF TU-12 (2M)

IN CASE OF TU-21 (6M)

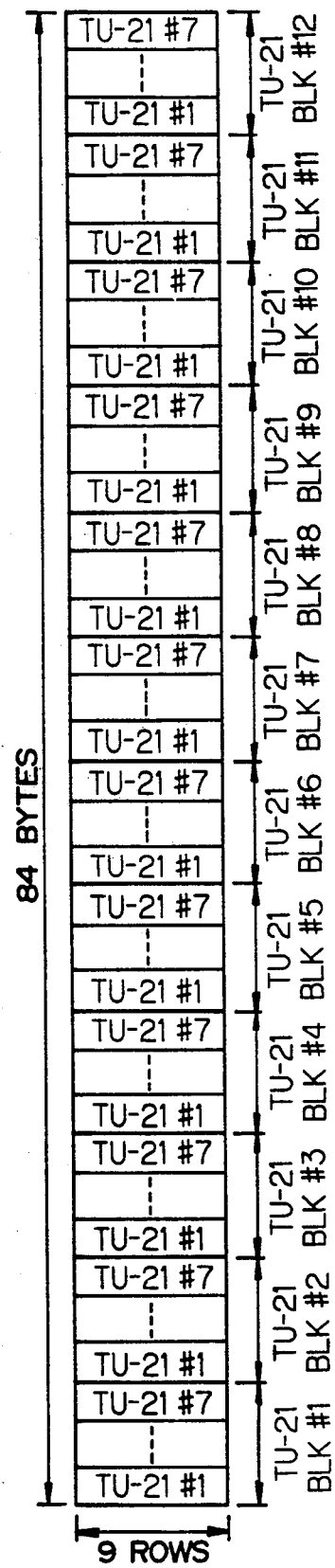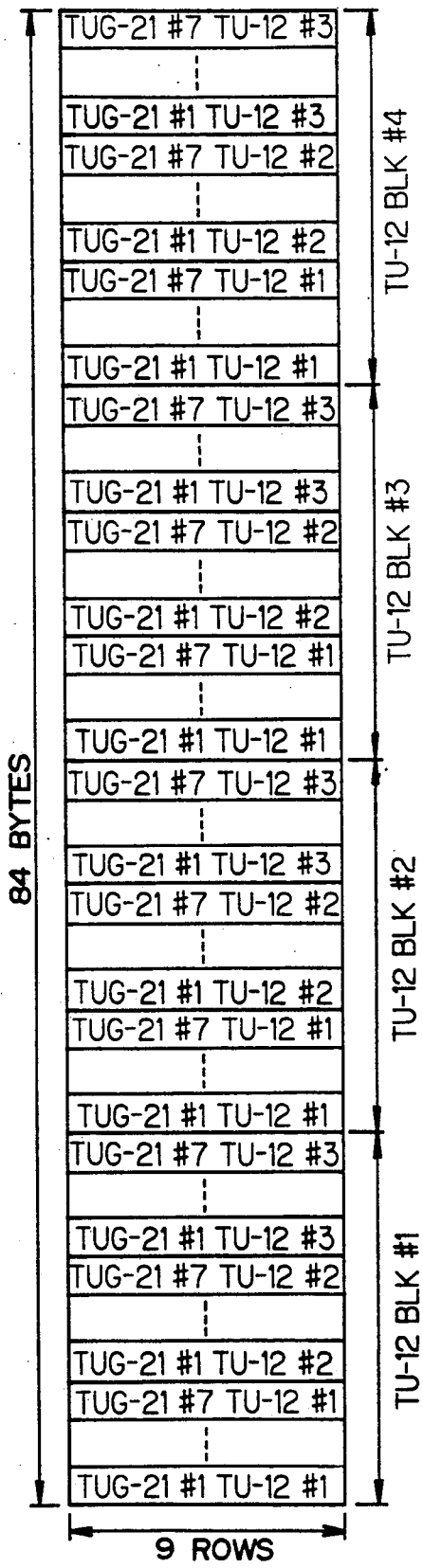

IN CASE OF TU-11

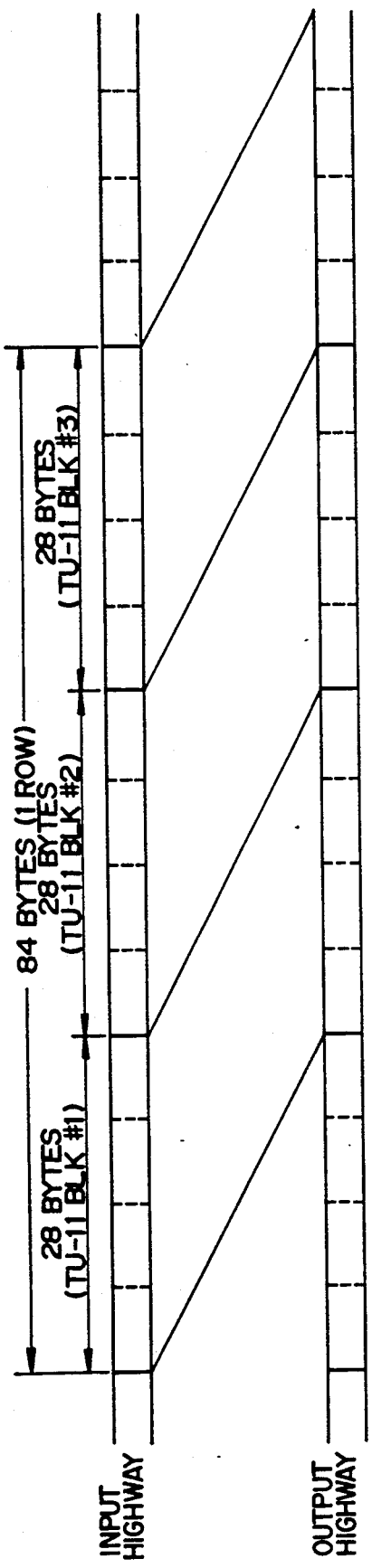
FIG. 10A  IN CASE OF TU-11 (1.5M)
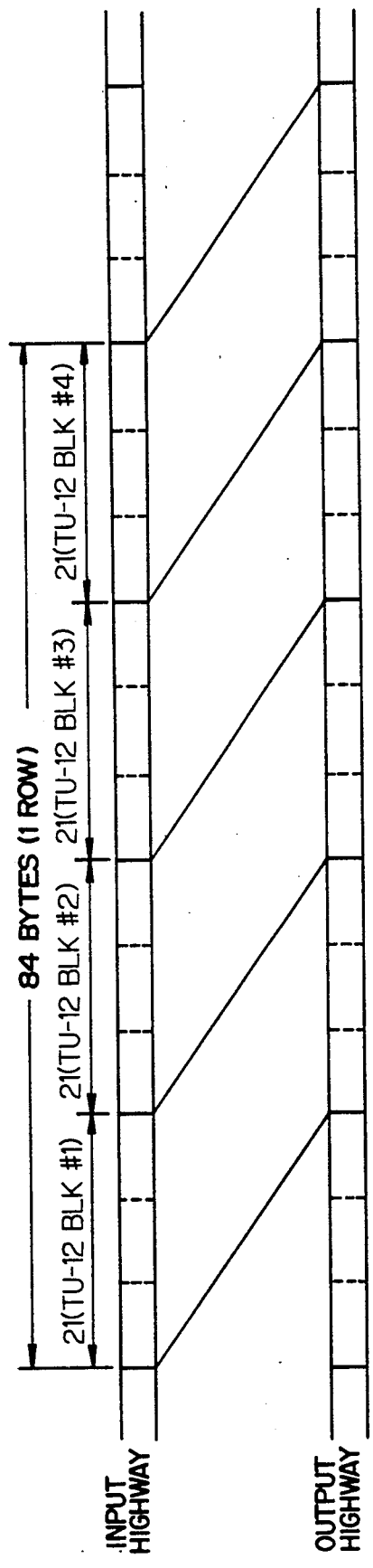
FIG. 10B  IN CASE OF TU-12 (2M)

IN CASE OF TU-21 (6M)

CIRCUIT SWITCHING METHOD AND APPARATUS FOR TIME DIVISION NETWORK WITH VARIOUS TRANSMISSION SPEEDS

BACKGROUND OF THE INVENTION

The present invention relates to a circuit switching method and apparatus for time division network with various transmission speeds, and more particularly, to a method and apparatus for switching time division multiplexed signals having a variety of transmission speeds.

Conventionally, as a method for switching time division multiplexed signals having a variety of transmission speeds, there is a method of performing a switching operation wherein a time division switch is used with a low speed circuit being as switching units, and a high speed circuit is assumed to be composed of a plurality of low speed circuits, as described in a document entitled "A Consideration on Wideband Switching System" by Shimoe, Murakami and Endo, in paper of The Institute of Electronics and Communication on Engineers of Japan, SE84-33, published in 1984. Also, as shown in the same document, there is a method wherein a switch for a high speed circuit, and a switch for a low speed circuit are disposed in parallel.

As for the method of performing a switching wherein a time division switch is used with a low speed circuit being as switching units and a high speed circuit is assumed to be composed of a plurality of low speed circuits, it cannot be applied unless there is a relationship where a high speed circuit transmission speed is an integer multiple of a low speed circuit transmission speed. In this case, it is possible to achieve a switching at various transmission speeds by means of a time division switch which defines the greatest common measure of the two classes of the circuit transmission speeds as a unit. However, in this case, a switching cycle becomes long, and correspondingly a signal delay is increased, which results in an increase of a necessary memory capacity.

For this reason, in a communication circuit where switches presenting a large signal delay exist in multiple stages between the transmission and reception terminals, an immense signal delay occurs between the transmission and reception terminals. On the other hand, the method in which a plurality of types of switches are disposed in parallel exhibits a small signal delay, however, requires a plurality of switches, whereby the apparatus scale is enlarged.

SUMMARY OF THE INVENTION

It is an object of the present invention to provide a circuit switching method and apparatus for network with various transmission speeds which are capable of reducing signal delays caused by switching operations even though signal transmission speeds on a plurality of time division multiplexed signals are not in an integer multiple relationship, on a small scale of apparatus, and particularly with a small memory capacity.

To achieve the above object, the present invention provides a circuit switching method for time division circuit signals with a plurality of transmission speeds which are multiplexed on an input highway, wherein information on transmission speeds of circuits to be multiplexed is stored in a memory, and a read cycle of a switching control memory is determined in accordance with the circuit transmission speed information at the time of a switching operation to thereby change a switching cycle in accordance with the circuit transmission speed.

Also, as means for implementing the above-mentioned method, a time division time switch adapted to write time division multiplexed signals from an input highway into a data memory and change a transmission path by controlling the order of read time division multiplexed signals from the data memory onto an output highway is provided which is composed of a first control memory for storing an access address of the data memory in an access control section of the data memory, a second control memory for storing circuit transmission speed information and an address control section of the data memory for accessing while changing a read cycle of the data memory in accordance with the circuit transmission speed information by the use of outputs of the first and second control memories.

It is desirable to use a dual-port memory for the data memory. A circuit switching apparatus having a larger capacity is configured by connecting the time division time switch to at least part of input or output highways of a time division space switch, later referred to.

Specifically, the time division space switch is composed of a plurality of input highways, a plurality of selection circuits for selecting particular circuit signals from a plurality of the plural input highways, a plurality of output highways respectively coupled to the plurality of selection circuits, a selection control memory provided in correspondence to the plurality of respective selection circuits for storing the selection circuit control information, a circuit transmission speed control memory for storing information on a circuit transmission speed at which transmission is performed through the plurality of output highways, and an address generating section for reading the selection circuit control information from the selection control memory based on the transmission speed information from the circuit transmission speed control memory.

According to the circuit switching method and apparatus for time division network with various transmission speeds, circuit transmission speed information is read out of the second control memory in a time division manner at the time of a switching operation of the time division time switch, and a read cycle of the first control memory is determined in accordance with this circuit transmission speed information, so that the switching operation is controlled by information read out of the first control memory for storing an access address of the data memory, whereby the switching cycle is changed in accordance with the circuit transmission speed. Since the switching cycle is changed in accordance with the circuit transmission speed, a time for accumulating data or a data delay time can be determined independently for each circuit transmission speed. Also, the capacity of the data memory may be not less than double the switching cycle of the lowest transmission speed. From a viewpoint of the simple configuration of the apparatus, it is desirable to have a capacity equal to the least common multiple of data amounts corresponding to the switching cycles or a capacity corresponding to an overhead added thereto.

BRIEF DESCRIPTION OF THE DRAWINGS

FIGS. 6, 9 and 12 are diagrams respectively showing frame structures of switching highways used in the embodiments of the present invention;

DESCRIPTION OF THE PREFERRED EMBODIMENTS

Figure 1:
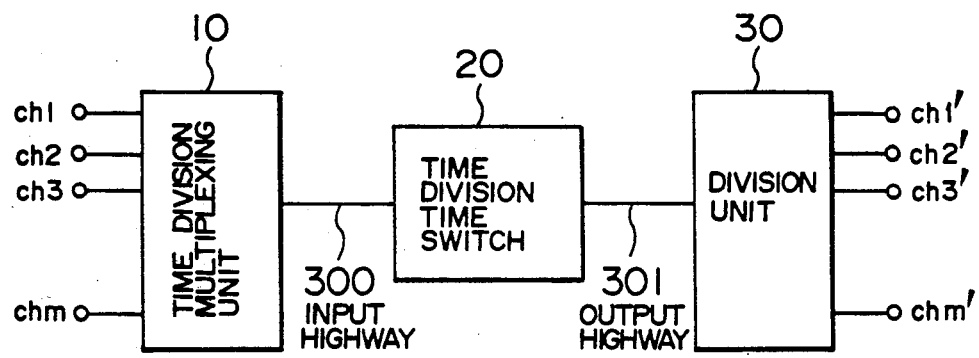
FIG. 1 is a structural diagram of a circuit switching apparatus using a time division time switch.

FIG. 1 shows the configuration of a circuit switching apparatus using a time division time switch according to the present invention. In the same drawing, signals on a plurality of circuits ch1, ch2, ch3, ..., chm are time-division multiplexed by a time division multiplexing unit 10 in a constant circuit order for each time slot and transmitted through an input highway 300. A time division time switch 20 is adapted to output the time division multiplexed signals on an output highway 301 as time division multiplexed signals which have the order of the time slots replaced on the basis of a circuit switching signal indicating to which of output circuits the respective input circuits ch1, ch2, ch3, ..., chm are to be connected. The time division multiplexed signals on the output highway 301 are sequentially outputted to output circuits ch1', ch2', ch3', ..., chm' by a division unit 30 in the time slot order, whereby a required circuit switching between the input circuits and the output circuits is performed.

Figure 3:
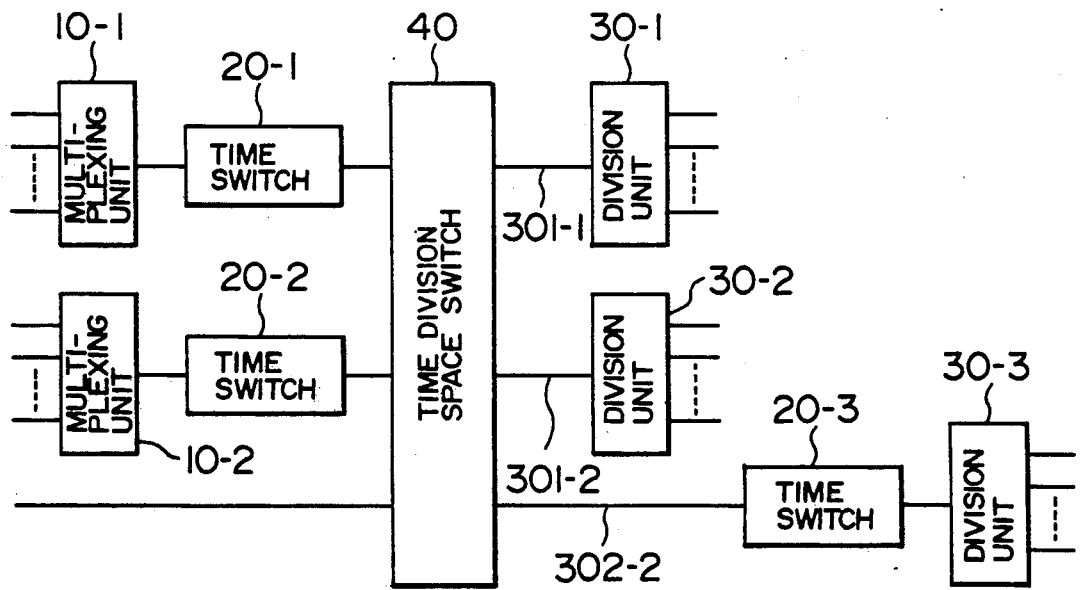
FIG. 3 is a diagram showing the configuration of a circuit switching apparatus using a time division time switch and a time division space switch.

The time division time switch 20, as shown in FIG. 3, can constitute a time division switch capable of coupling a larger number of circuits by a combination of a time division space switch 40.

Figure 2:
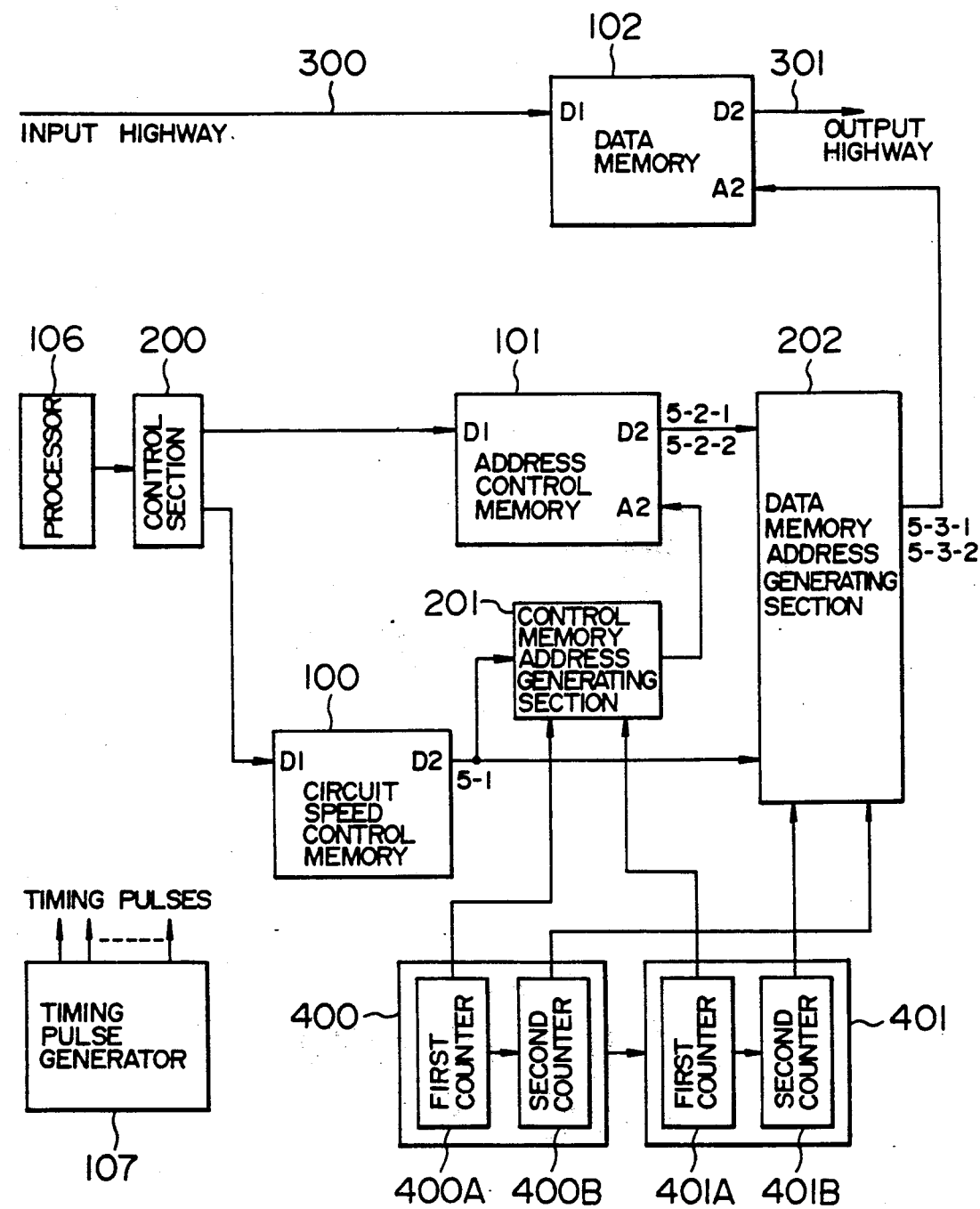
FIGS. 2, 8 and 11 are block diagrams respectively showing an embodiment of the time division time switch appearing in FIG. 1 according to the present invention.

FIG. 2 shows the configuration of the time division time switch 20 in detail, wherein the time division time switch 20 comprises the input highway 300, a dual port data memory 102, for storing time division multiplexed signals on the input highway 300, which has two ports which allow a write address and a read address to be individually inputted thereto, the output highway 301, a circuit speed control memory 100 for storing circuit speed information on signals read out of the data memory 102 onto this output highway 301, an address control memory 101 for storing circuit switching information for connecting the input circuits ch1, ..., chm to the output circuits ch1', ..., chm' in accordance with a request, a control memory address generating section 201 for providing a read address to the address control memory 101, a data memory address generating section 202 for generating a read address of the data memory 102, and counters 400, 401 for generating an address generating signal and necessary pulses used for generating the addresses outputted from the control memory address generating section 201 and the data memory address generating section 202. The circuit speed information and the circuit switching information are inputted from a processor 106 through a control section 200 and stored in the circuit speed control memory 100 and the circuit switching control memory 101, respectively. The above respective constituents are controlled by a timing pulse from a timing pulse generator 107.

Next, the operation of the first embodiment will be explained.

Figure 4A:
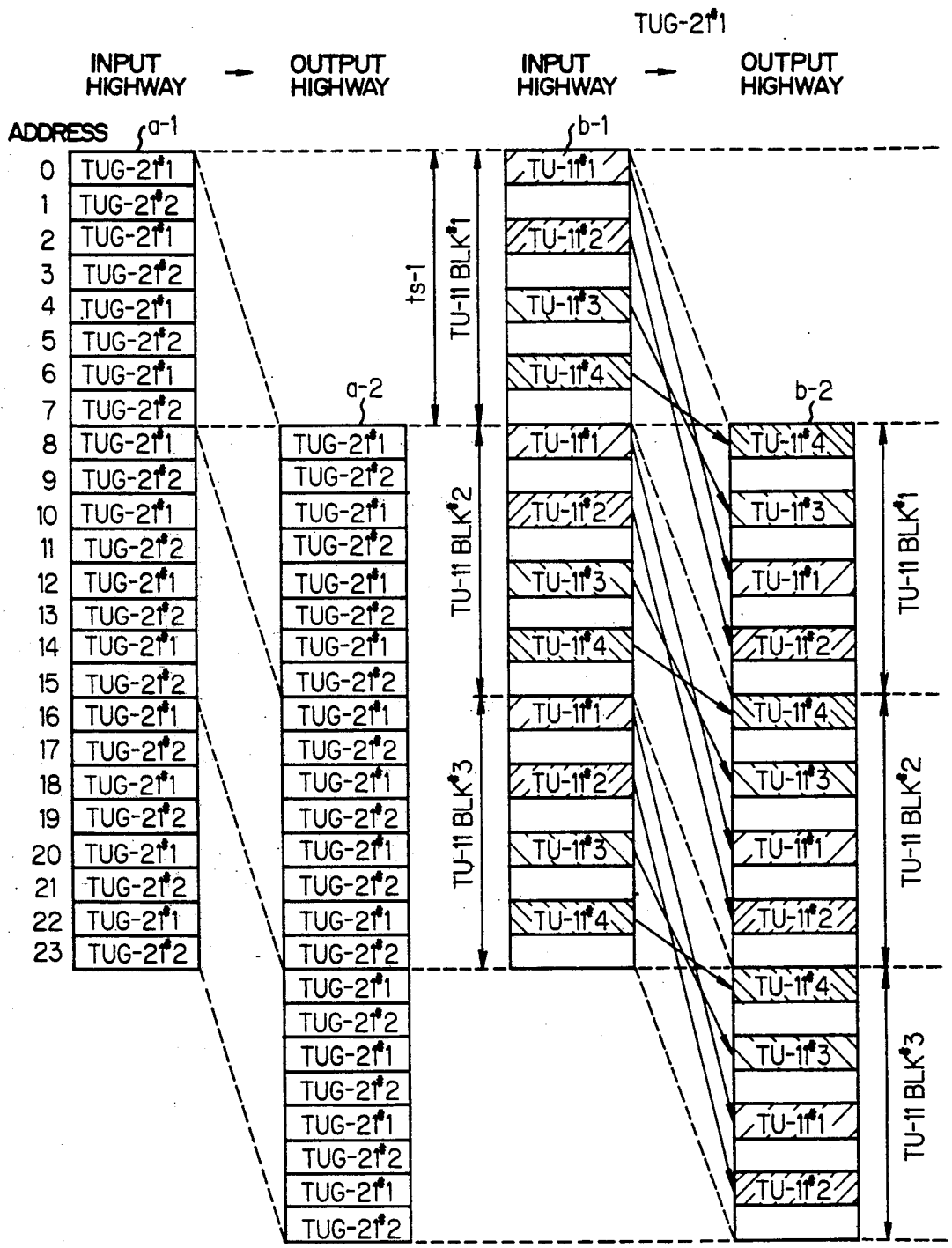
FIG. 4 is a format of a circuit signal on input/output highways used for explaining the operation of FIG. 2.
Figure 4B:
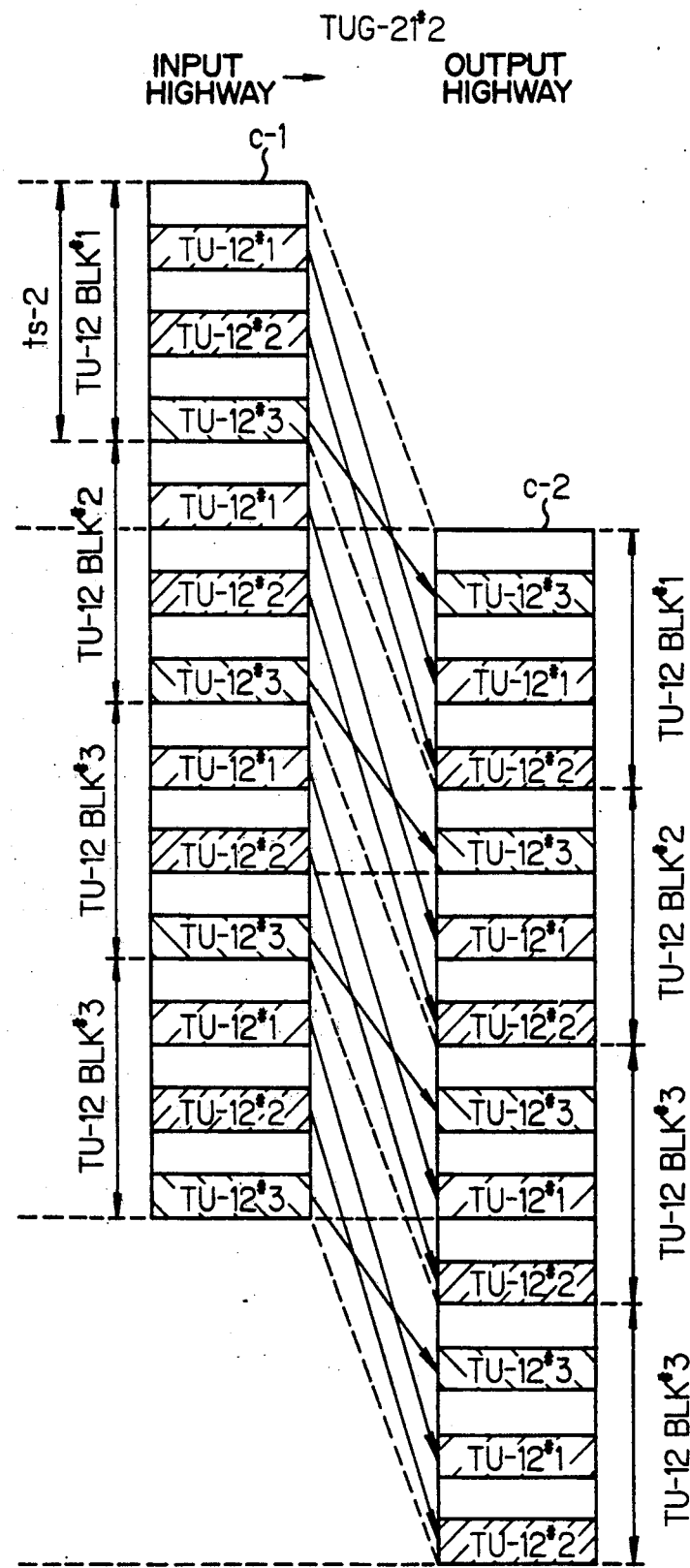

FIG. 4 shows a time chart used for explaining the operation of FIG. 2. For simplifying the explanation, a case where four circuits TU-11#1, #2, #3 and #4 with a circuit speed of 1.5 Mb/s and three circuits TU-12#1, #2 and #3 with a circuit speed of 2 Mb/s are time-division multiplexed will be explained. TU-11 and TU-12 correspond to Tributary Unit 11 and Tributary Unit 12 respectively in terms of International Telegraph and Telephone Consultative Committee (CCITT). In FIG. 4, reference characters a-1 and a-2 respectively represent a transmission format of the circuit of each time slot on the input highway 300 and the output highway 301. TUG-21#1 which is abbreviation for Tributary unit Group 21 in terms of CCITT, is a reference representing a time slot group including the group of the circuits TU-11#1-#4 of 1.5 Mb/s, while TUG-21#2 is a reference representing a time slot group including the circuits TU-12#1-#3 of 2 Mb/s. Reference characters b-1 and c-1 are provided to separately indicate contents of the time slot groups TUG-21#1 and TUG-21#2 on the input highway (or may be thought in the data memory 102) for better understanding, wherein they are actually a series of signals placed in the order of TU-11#1, TU-12#1, TU-11#2, TU-12#2, .... Reference characters b-2 and c-2 are also provided to separately indicate contents of the time slot groups TUG-21#1 and TUG-21#2 on the output highway for better understanding. The axis of ordinates represents the time.

The diviation between the input highway and the output highway on the axis of ordinates indicates a signal delay caused by the time division time switch, and is equal to the cycle (switching cycle) of the lowest speed circuit of a plurality of circuits with various speeds which are to be multiplexed. More specifically, in the example of FIG. 4, the switching cycle is equal to the cycle ts1 of the circuit TU-11#i (i=1, 2, 3, 4) of the low speed group TUG-21#1. Incidentally, FIG. 4 shows a case where signals at two different circuit speeds are multiplexed, however, more signals at different circuit speeds may be multiplexed. For performing such multiplex, it is necessary that those having the same TUG number of the group TUG-21, that is, the same TUG number #j of TUG-21#j are signals at the same transmission speed. A collection of signals in a switching cycle for each transmission speed will be hereinafter represented by a transmission speed identifier (TU-11 or TU-12) and a block number (BLK#i).

Figure 5B:
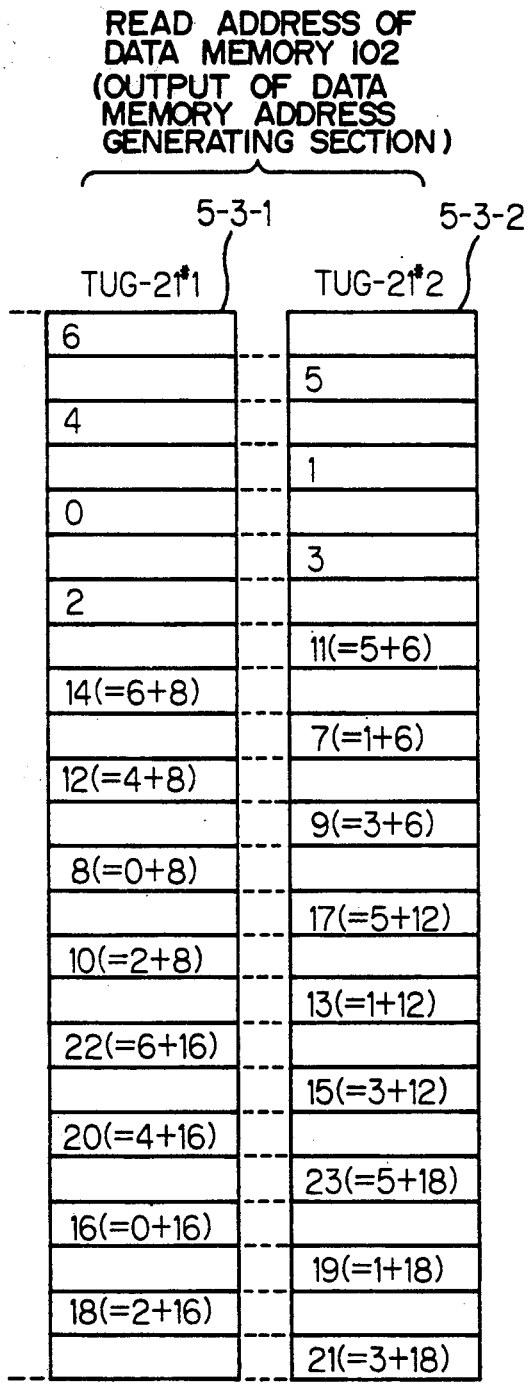
FIG. 5 is a diagram showing each memory output used for explaining the operation of FIG. 2.

FIG. 5 shows the output 5-1 of the circuit transmission speed control memory 100, the outputs 5-2-1 and 5-2-2 of the address control memory 101 and read addresses (the output of the data memory address generating section 202) 5-3-1 and 5-3-2 of the data memory 102 in time series. Incidentally, the outputs 5-2-1 and 5-2-2 are shown as being separate, however, they are actually a single time series signal. The outputs 5-3-1 and 5-3-2 are also shown in similar manner.

Turning back to FIG. 2, a time division multiplexed signal in which the signals b-1 and c-1 in FIG. 4 are multiplexed is written into the data memory 102 from the input highway 300. The capacity of the data memory 102, in principle, may be such that permits storing an amount of data inputted in a period double the switching cycle ts1 of the lowest speed circuit of the circuits with plurality of transmission speeds which are to be multiplexed, however, for facilitating the configuration of the apparatus, it is preferable to provide a capacity to store an amount of data which may be inputted in a period equal to the least common multiple of a plurality of switching cycles corresponding to a plurality of transmission speeds, as will be later described. For example, in FIG. 4, the number of time slots included in the period ts1 of the switching cycle of the circuit TU-11#1 is 8, while the number of time slots included in the period ts2 of the switching cycle of the circuit TU-12#1 is 6, where the number of time slots in a period equal to the least common multiple thereof is 24. The signals b-1 and c-1 being transmitted onto the input highway 300 are written into sequential addresses from the head address of the data memory 102 in the transmitted order. When one row portion (24-time slot portion) of signals has been written, the next one row portion of signals is written from the head address of the data memory 102 in the transmitted order while erasing the previously written data.

The circuit speed control memory 100 stores a signal for specifying a class of the circuit speeds assigned to respective TUG on the output highway 301, specifically, one of TU-12 and TU-11. In the present embodiment, since there are only two classes of circuit speeds, i.e., 1.5 Mb/s and 2 Mb/s in the circuit speed control memory 100, the circuit speed control memory 100 alternately outputs a signal representing TU-11 and a signal representing TU-12, as a signal 5-1 shown in FIG. 5, in synchronism with the time slots. In the address control memory 101, the numbers of circuits on the input highway 300 to be connected to the respective output circuits on the side of the output highway 301, that is, the switching control information is recorded in a block (BLK) corresponding to one switching cycle, as shown in signals 5-2-1 and 5-2-2 of FIG. 5, in such a format that the number of TUG-21 and the circuit number are also recorded for each of respective circuit speeds. In other words, in the address control memory 101, there are written addresses for reading one block of respective circuit speeds written in the data memory 102 in the order of the output circuits to be connected. As shown in FIG. 5, these addresses are numbered 0 to 7, wherein the circuit addresses of TU-11 are written in the addresses 0, 2, 4, 6 while the circuit addresses of TU-12 in the addresses 1, 3, 5, both in the reading order, with the address 7 remaining unused. Writing of the control information into the circuit speed control memory 100 and the address control memory 101 is performed by the processor 106 through the control section 200. The processor 106 automatically performs writing of the control information when a circuit on the output highway side is specified by a dial communication. Alternatively, if the circuit switching between telephone offices is humanly determined, writing of the control information is performed by a keyboard manipulation of the operator.

The cycles ts1 and ts2 of the time division switching correspond to the difference in the respective transmission speeds (TU-12 or TU-11) of the multiplexed circuits. This embodiment is provided with two kinds of counters 400, 401 which count a timing pulse having the cycle of the time slots from the timing pulse generator 107. The counter 400, which has a first counter 400A which repeatedly counts from 0 to 7 and a second counter 400B which counts a carry signal of the counted value from 0 to 2, outputs these counted values to generate an address generating signal for TU-11. The counter 401 has a first counter 401A which counts from 0 to 5 and a second counter 401B which counts a carry signal of the counted value from 0 to 3, and outputs these counted values to generate an address generating signal for TU-12.

From the circuit speed control memory 100, the signal 5-1 representing the class of the circuit speed is read out in a time division manner for each time slot and supplied to the control memory address generating section 201 and the data memory address generating section 202. In the control memory address generating section 201, in accordance with the signal indicating the class of circuit speed from the circuit speed control memory 100, either of the counters 400 and 401 is alternately selected and a counted value of the first counter in the counter 400 or 401 is supplied to the address control memory 101 as a read address of the address control memory 101 for each time slot, thereby making it possible to change the read cycle of the address control memory 101 in accordance with the class of the circuit speed corresponding to each time slot.

More specifically explaining with reference to FIG. 5, in the first time slot TS#1, the output 5-1 of the memory 100 is TU-11 so that the address generating section 201 outputs a counted value 0 of the first counter in the counter 400 to the address control memory 101 as a read address. In the address 0 of the address control memory 101, there is stored an address 6 (TUG-21#1, TU-11#4) of the data memory 102 to be read out. That is, it means that the seventh time slot from the top of the signal b-1 corresponding to an address 6 in FIG. 4 is read out.

In the second time slot TS#2, since the output 5-1 of the memory 100 is TU-12, the address generating section 201 outputs a counted value 1 of the first counter in the counter 401 to the address control memory 101 as a read address. In the address 1 of the address control memory 101, there is stored the address 5 (TUG-21#2, TU-11#3) of the data memory 102 to be read out. That is, it means that the sixth time slot from the top of the signal c-1 corresponding to the address 4 in FIG. 4 is read out. The similar operation is repeated afterward.

In the eighth slot TS#8, the output 5-1 of the memory 100 is TU-12 so that the address generating section 201 outputs a counted value 1 of the first counter 401A to the address control memory 101 as a read out address. Since this operation is performed one switching cycle after the second time slot TS#2 with respect to TU-12, the data memory address generating section 202 receives the above-mentioned address 5 from the address control memory 101 as well as selects a counted value 1 of the counter 401B in response to a signal from the circuit speed control memory 100. This counted value 1 means 6 which corresponds to the switching cycle. The data memory address generating section 201 therefore adds 6 corresponding to one switching cycle to the above-mentioned address 5 to derive an address 11 of the data memory 102.

Likewise, in the ninth time slot, the output 5-1 of the memory 100 is TU-11, the address generating section 201 generates a read address 0 of the address control memory 101 on the basis of a counted value from the counter 400A. Since this operation is performed one switching cycle of TU-11 after the first time slot TS#1, the data memory address generating section 202 adds 8 corresponding to one switching cycle of TU-11 to the above-mentioned address 6 to derive an address 14 of the data memory 102, and a signal at the address 14 of the data memory 102 is read out onto the output highway 301. When the above described operation is repeated up to the 24th time slot TS#24, that is, during 3 switching cycles of TU-11 and 4 switching cycles of TU-12, the counter 401 is reset by a carry signal of the second counter 400B, thereby returning to the condition of the aforementioned first time slot, followed by performing a time switching operation as shown in FIG. 4.

FIGS. 6 and 7 show time charts respectively illustrating a format of time division multiplexed signals in a second embodiment and the time relationship between the input and the output of the data memory 102.

FIGS. 6A, 6B and 6C show frame structures of signals in which multiplexed are TU-21 having a speed of approximately 6 Mb/s, TU-12 having a speed of approximately 2 Mb/s and TU-11 having a speed of approximately 1.5 Mb/s, respectively described in the Blue Book Recommendation G.709 published by International Telegraph and Telephone Consultative Committee (CCITT). A frame is organized of 90 bytes in the horizontal direction by 9 rows in the vertical direction, and transmitted in order from left to right of the first row, from left to right of the second row, . . . , and from left to right of the ninth row. Each row is composed of 6 bytes (3+1+1+1) of a control signal (overhead) and 84 bytes (3×28) of information signals. The information signal is formed of 7 kinds of groups TUG#1-TUG#7 multiplexed therein. In TUG-21 of the same #i (i=1, 2, ... 7), circuit signals having the same transmission speed are multiplexed, whereas, if the number #i of the TUG-21 is different, the class of circuits (transmission speeds) may be different. FIGS. 6A, 6B and 6C show cases where all TUG-21's are circuits having the same transmission speed for simplicity. More specifically, FIG. 6A shows a case of TU-21, FIG. 6B TU-12 and FIG. 6C TU-11. Actually, signals on different classes of transmission circuits can be mixedly multiplexed in a different TUG number under the condition that signals of the same transmission speed are multiplexed, when the number #i of TUG-21 is identical. The time division time switch for the time division multiplexed signals shown in FIG. 6 is implemented by a configuration substantially similar to FIG. 2. In this case, the data memory 102 has a capacity of one row portion of this frame structure (90 bytes). The counter 400 is utilized as an address generating section for TU-21.

Figure 7C:
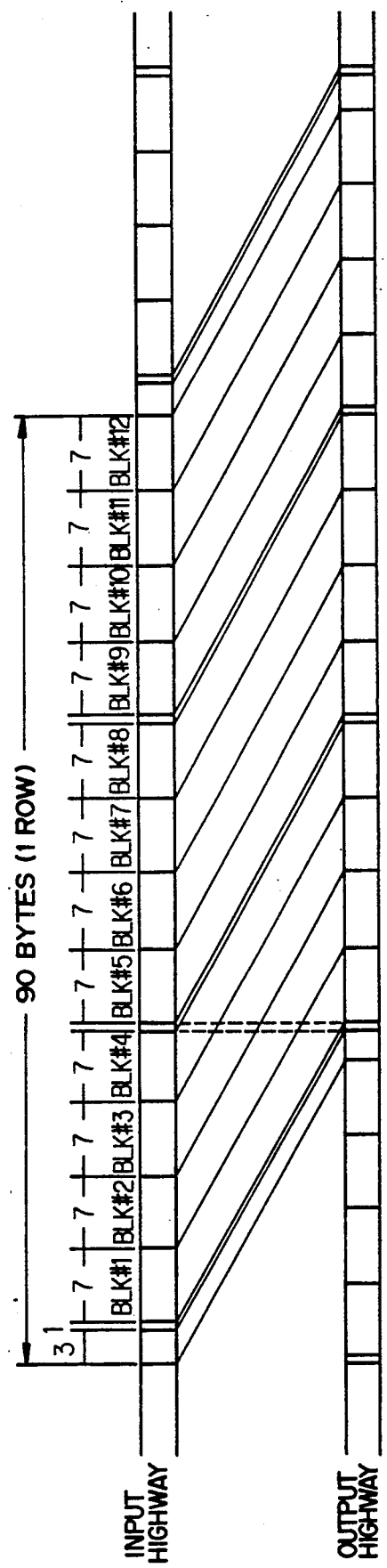
FIGS. 7, 10 and 13 are time charts respectively showing a time relationship of signals between input/output highways in the embodiments of the present invention.

The time relationship between input and output signals of the data memory 102 is as shown in FIG. 7. In the case of TU-11, as shown in FIG. 7A, a read from the data memory 102 is performed with a delay of 1 BLK (the switching cycle of TU-11) with respect to a write. For example, when TU-11-BLK#2 is being written, TU-11-BLK#1 is being read. Since a block is read out after the block has been completely written, a read BLK will not fall on a write BLK. This is intended to prevent the time order among TU-11's on the same transmission path from being replaced with one another over one switching cycle or one block. In the case of a transmission speed other than TU-11, an average delay is made to be a time period corresponding to TU-11-BLK such that the frame structure on the output highway 301 is coincident with the case of TU-11. For example, in the case of TU-12 as shown in FIG. 7B, at the start of writing TU-12#2 in TU-12-BLK#2, a read of TU-12-BLK#1 is started. Also, in the case of TU-21 as shown in FIG. 7C, a read of TU-21-BLK#1 is performed at the time of a write of TU-21-BLK#5, thereby preventing the time order of signals in respective TU classes from being replaced over previous and subsequent blocks. Further, the average delay, corresponding to the length of TU-11-BLK, is constant irrespective of the TU classes.

Since the switching control information from the address control memory 101 includes only read addresses of BLK#1 of the respective circuits, the data memory address generating section 202 generates a read address of the data memory 102 at the time of a read from other than BLK#1. Since the switching cycle is different depending upon the class of circuits, a read area from the data memory 102 is different depending upon the class of circuits. For this reason, it is not possible to apply a so-called double buffer system wherein a write area is completely separated from a read area such that signals on conventional circuits having the same speed are multiplexed by switching, wherein a write is being performed into one area while a read is being performed from another area. In the present embodiment, therefore, a dual-port memory, which has one port exclusively used as a write port and the other port exclusively used as a read port, is employed as the data memory 102 such that a read address and a write address are independently specified. Incidentally, it is alternatively possible to double the read and write speed to perform both read and write in a single time slot by the use of a one-port memory.

Figure 8:
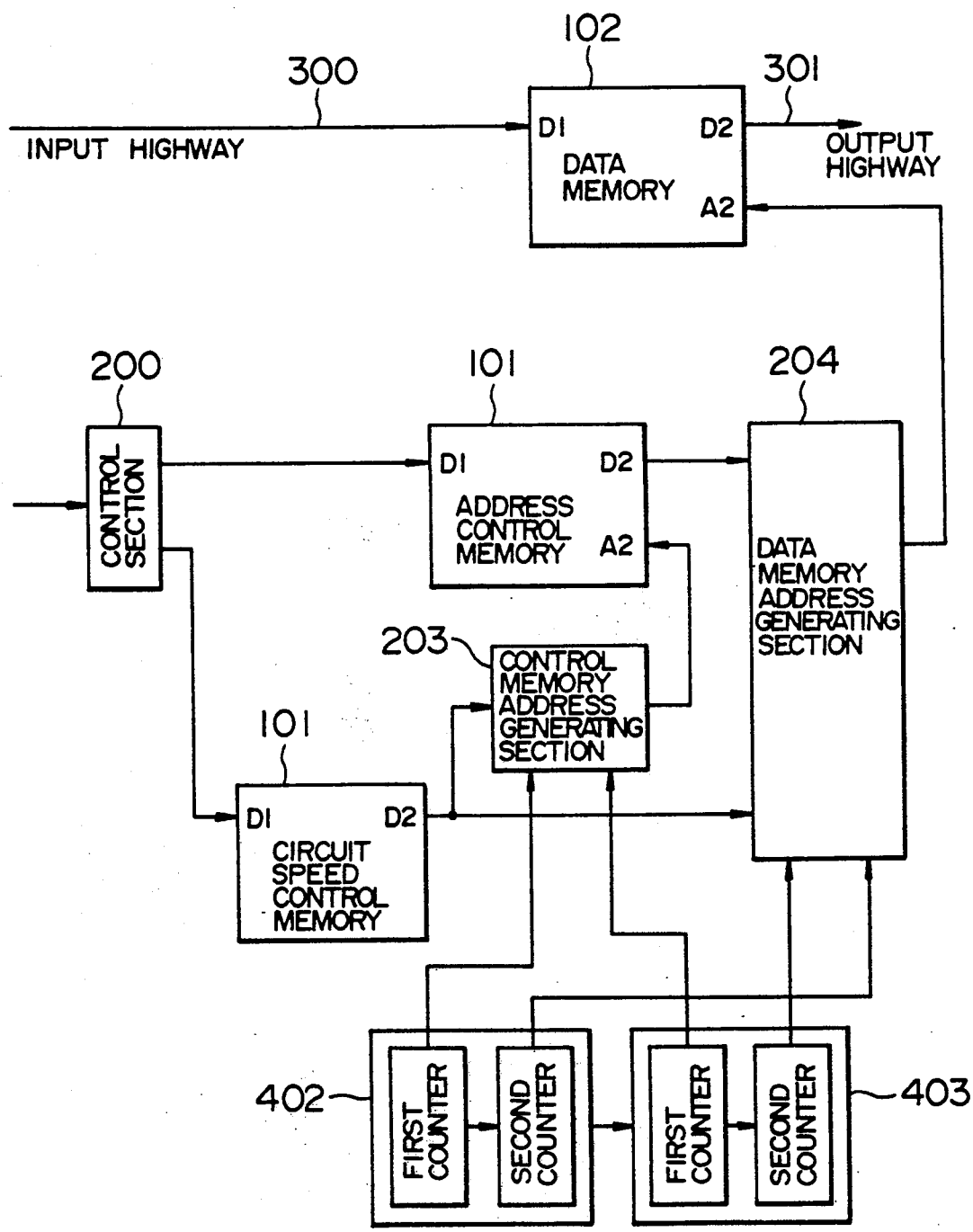

Next, the configuration of a third embodiment of the present invention will be explained with reference to a block diagram shown in FIG. 8. The configuration of the third embodiment is almost identical to the configuration of the embodiment shown in FIG. 2, however, since the timing of the operation of the circuit is different, a control memory address generating section 203, a data memory address generating section 204, and counters 402, 403 has different internal constructions.

Figure 9C:
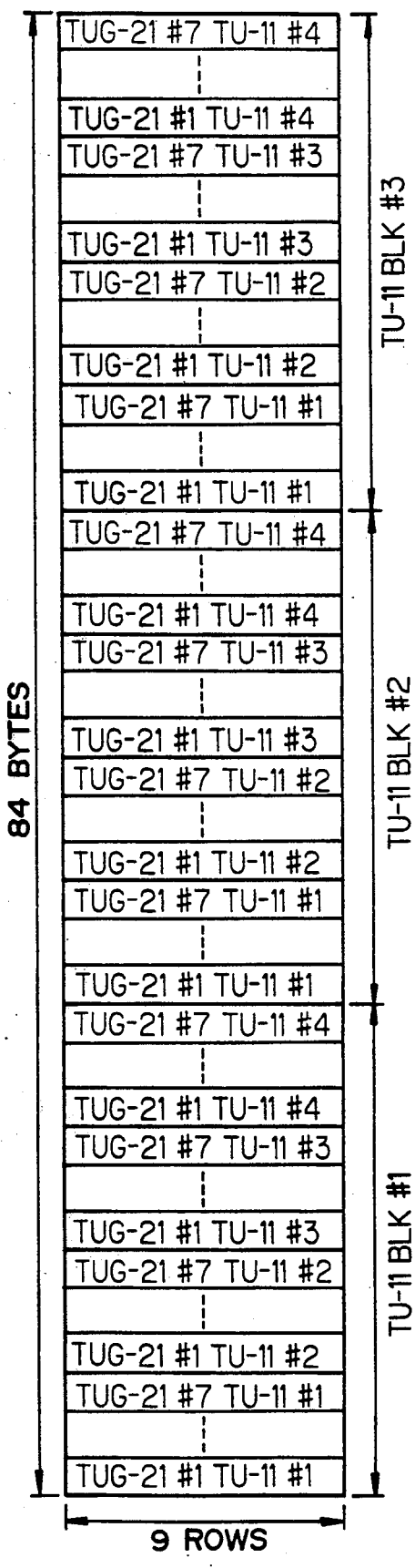
Figure 10C:
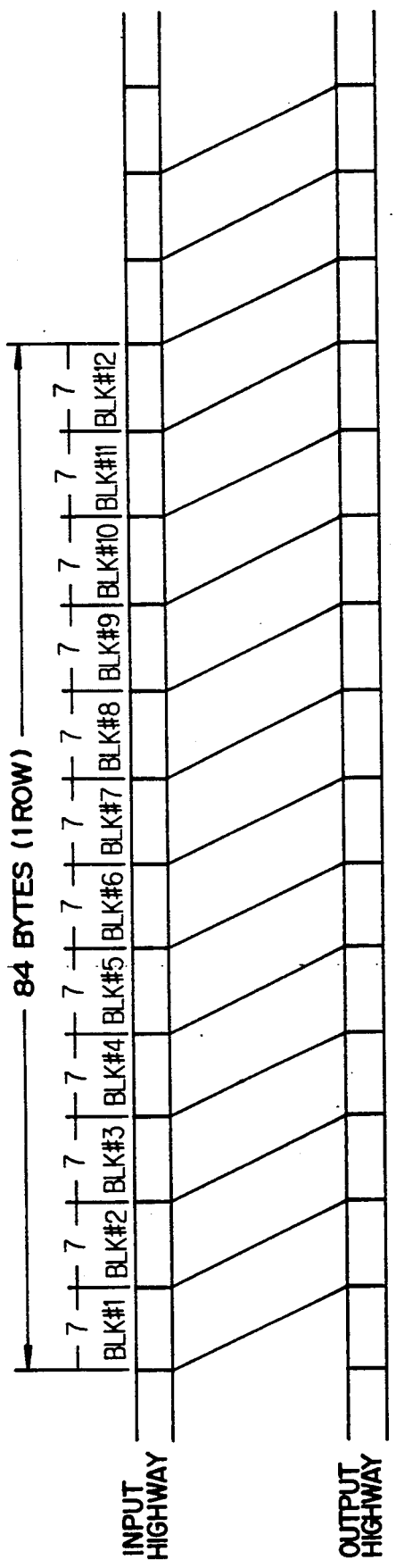

The operation of the third embodiment will be next explained. FIG. 9 shows an example of a frame structure of signals on the input highway 300 and the output highway 301. Multiplexed signals are either of TU-21, TU-12 and TU-11 described in Blue Book Recommendation G. 709 published by CCITT, similar to the second embodiment. Also, in a manner similar to the second embodiment, if the number #i of TUG-21 is different, the class of circuit may be different, and signals having different transmission speeds are mixedly multiplexed under the condition that the each TUG-21 contains the same TU class. The third embodiment is analogous to the operation of the first embodiment, while the data format thereof is analogous to the second embodiment. However, it differs from the second embodiment in that the phase relationship of data between the input highway 300 and the output highway 301 is different. The phase relationship of data between the input highway 300 and the output highway 301 is, as shown in FIG. 10A, similar to the second embodiment in the case of TU-11, such that a read out of the data memory 102 is performed with a delay of one BLK portion from the time of a write, wherein TU-11-BLK#1 is being read when TU-11-BLK#2 is being written. However, as shown in FIG. 10B, in the case of TU-12, TU-12-BLK#1 is read out at the time TU-12-BLK#2 is written. Also, as shown in FIG. 10C, in the case of TU-21, TU-21-BLK#1 is read out at the time of a write into TU-21-BLK#2. Thus, the counters 402 and 403 can be operated independently of each other, which removes the necessity of resetting the counter 401 in synchronism with a carry signal of the counter 400, as the embodiment shown in FIG. 2. For each class of circuits, an average delay corresponds to the length of BLK of each class of circuits, and an average of delay time is minimum under the condition that the time order among blocks is made constant. Since the switching control information from the address control memory 101 is a read address of BLK#1 of each circuit, the data memory address generating section 204 generates a read address of the data memory 102 when blocks other than BLK#1 read. Incidentally, the present embodiment employs a dual-port memory as the data memory 102 so as to independently indicate a read address and a write address, however, both read and write may be performed within one single time slot by the use of a one-port memory.

The present embodiment is advantageous in that an average delay time of each circuit class is minimum condition that the time order among TU's is made constant.

Figure 11:
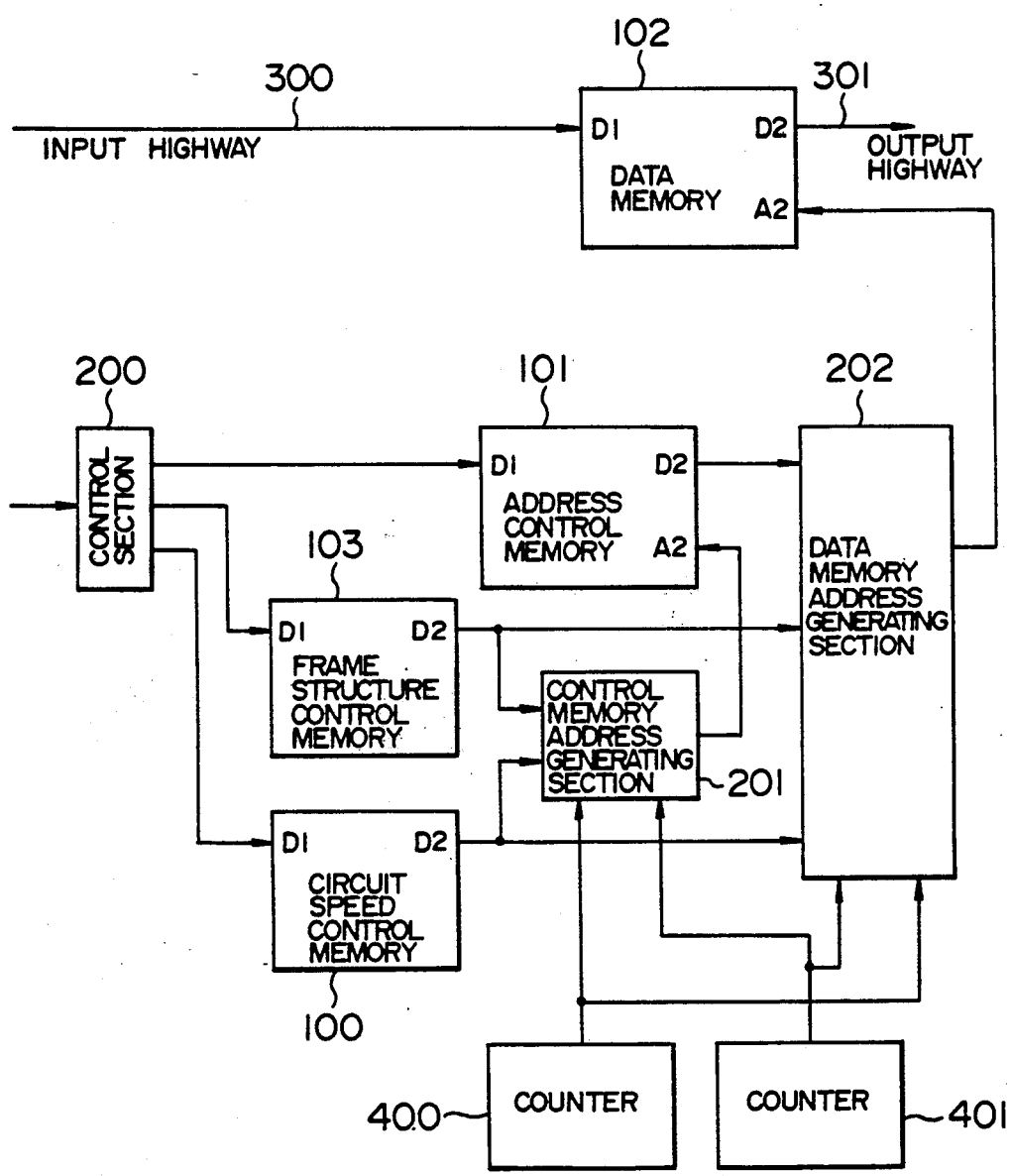

Next, the configuration of a fourth embodiment of the present invention will be explained by the use of a block diagram shown in FIG. 11. The configuration of the embodiment shown in FIG. 11 is equal to the configuration of the embodiment shown in FIG. 2 with a frame structure control memory 103 added thereto.

Next, the operation of the fourth embodiment will be explained. The fourth embodiment treats AU (administrative unit)—32 having a speed of approximately 50 Mb/s in addition to TU-21, TU-12 and TU-11, described in Blue Book Recommendation G.709 published by CCITT. The frame structure of signals on the input highway 300 and the output highway 301 is substantially similar to that of the second embodiment (FIG. 6) in the case of TU-21, TU-12 and TU-11, while the frame structure of AU-32 is shown in FIG. 12.

Figure 12:
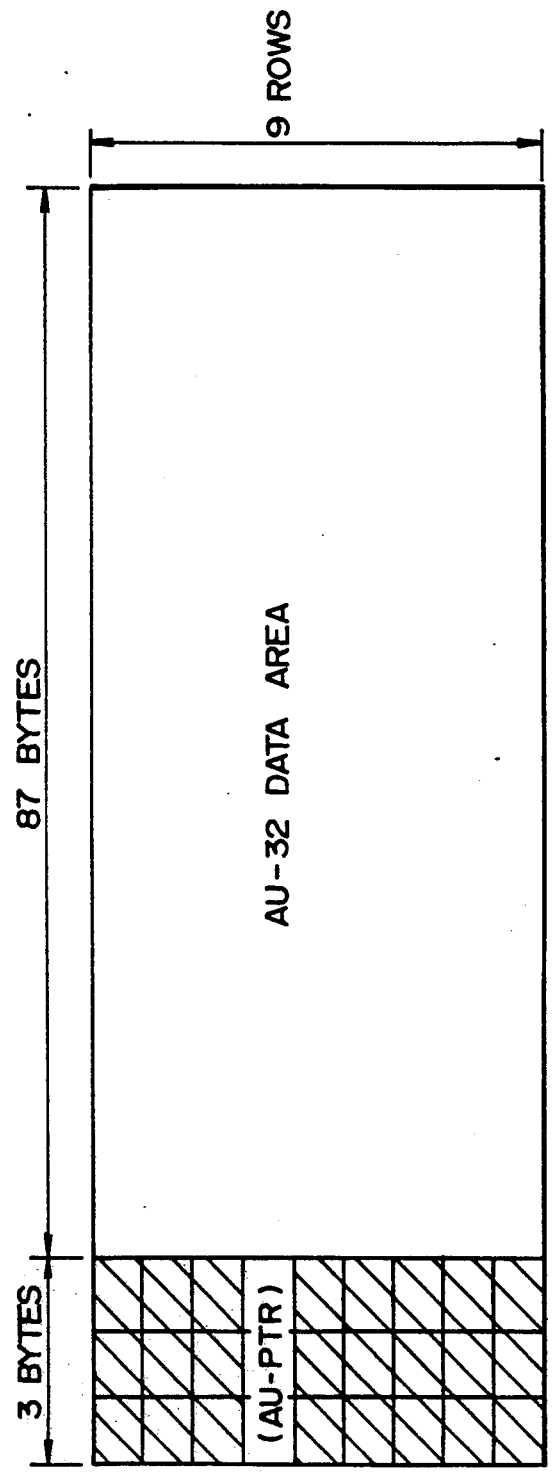

As shown in FIG. 12, one row is composed of 90 bytes including 3 bytes of control information and 87 bytes of signal information, while one frame is composed of 9 rows and transmitted within 125 µs. In FIG. 12, a single AU-32 is shown for simplifying the explanation, however, actually on a highway having a transmission speed of 155.52 Mb/s, 3 of the signals AU-32 in the frame structure shown in FIG. 12 are multiplexed. In place of each circuit of AU-32 in a triplex composed of the three circuits of AU-32's, it is possible to transmit 7 circuits of TU-21 (6 Mb/s), 21 circuits of TU-12 (2 Mb/s) or 28 circuits of TU-11 (1.5 Mb/s). It is thus possible to perform multiplexed transmissions by the use of a 155.52 Mb/s line, wherein AU-32, TU-21, TU-12 and TU-11 are variously combined.

In the present embodiment, in a manner similar to the second embodiment, one row portion of data is written into sequential numbers from the first address of the data memory in the transmitted order. This embodiment employs a 155.25 Mb/s signal which is composed with a mix of zero or more AU-32S and zero or more times of 7 TUG-21 (for example, 7 circuits of TU-21 (6 Mb/s), 21 circuits of TU-12 (2 Mb/s) or 28 circuits of TU-11 (1.5 Mb/s)), so that the frame structure control memory 103 discriminates whether or not a signal to be read onto the output highway 301 is of AU-32. With a signal of AU-32, the frame structure control memory 103 has the data memory address generating section 202 generate an address for reading a signal of AU-32 from the data memory 102 in accordance with output of the address control memory. If it is not of AU-32, the frame structure control memory 103 has the control memory address generating section 201 selectively read counted value from the counter 400 or 401 in accordance with circuit speed information from the circuit speed control memory 100. The control memory address generating section 201, by a method as explained in FIG. 2, reads the address of a block #1 from the address control memory 101 at an address indicated by the counted value.

In this embodiment, signals of AU-32 at approximately 50 Mb/s are triplexed, whereby the frame structure control memory 103 repeatedly outputs frame structure data (data indicative of AU-32 shown in FIG. 12 or TUG-21 shown in FIG. 6) for every time slot at intervals of 3 time slots.

Figure 13:
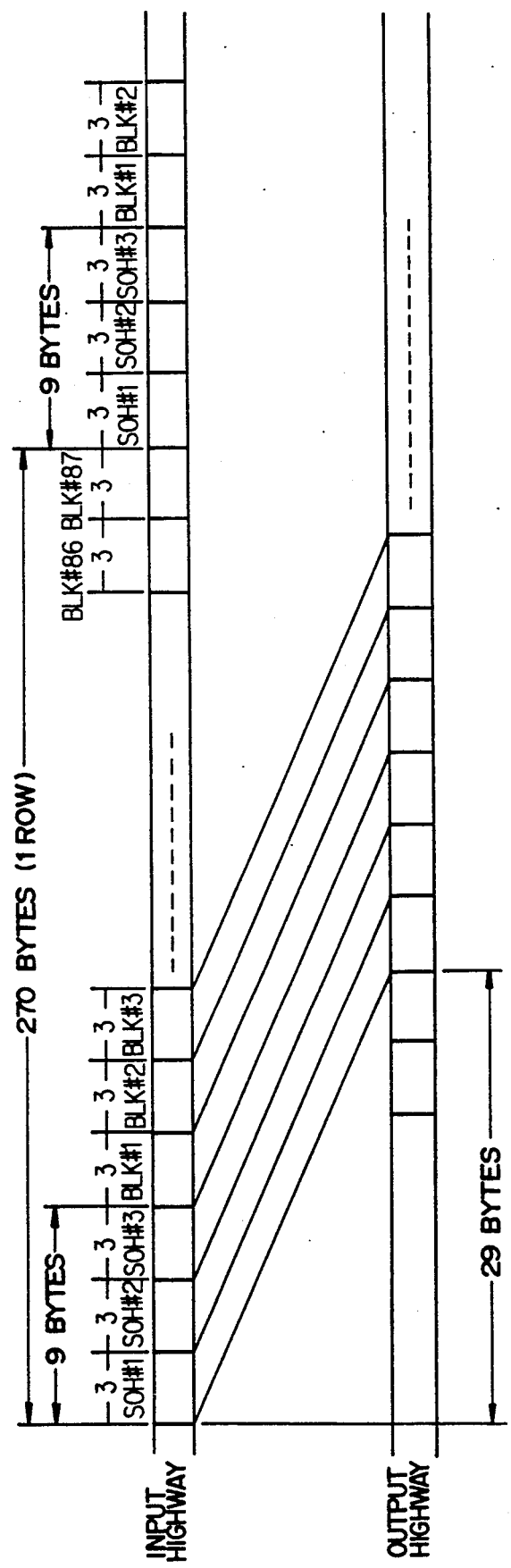

The control memory address generating section 201, on the basis of information indicating the TU class from the circuit speed control memory 100 and information indicating the frame structure from the frame structure control memory 103, generates a read address of the address control memory 101 by selecting a counted value from the counter 400 and a counted value from the counter 401. Thus, the read cycle (switching cycle) of the address control memory 101 is changed in accordance with the class of AU and TU. The phase relationships between signals on the input highway 300 and the output highway 301 in the cases of TU-21, TU-12 and TU-11 are respectively as shown in FIGS. 7A, 7B and 7C. On the other hand, the phase relationship between signals on the input highway 300 and the output highway 301 of AU-32 is, as shown in FIG. 13, wherein there is present a delay corresponding to one BLK portion of TU-11 having the lowest transmission speed. These relationships prevent the time order among blocks in respective AU and TU classes from changing. The average delay corresponds to a time taken for transmitting one block of TU-11 and is constant irrespective of the AU and TU classes. Since the switching control information from the address control memory 101 includes read addresses of BLK#1 of the respective AU and TU, the data memory address generating section 202 generates read addresses of the data memory 102 at the time blocks other than BLK#1 is read. Incidentally, the present embodiment also employs a dual-port memory as the data memory 102 so as to independently specify a read address and a write address, however, a one-port memory may be employed to perform both read and write within a single time slot.

The present embodiment, since AU and TU can be mixedly accommodated, can easily construct a circuit switching apparatus in which circuits with the circuit speeds largely different from one another are mixed.

Figure 14:
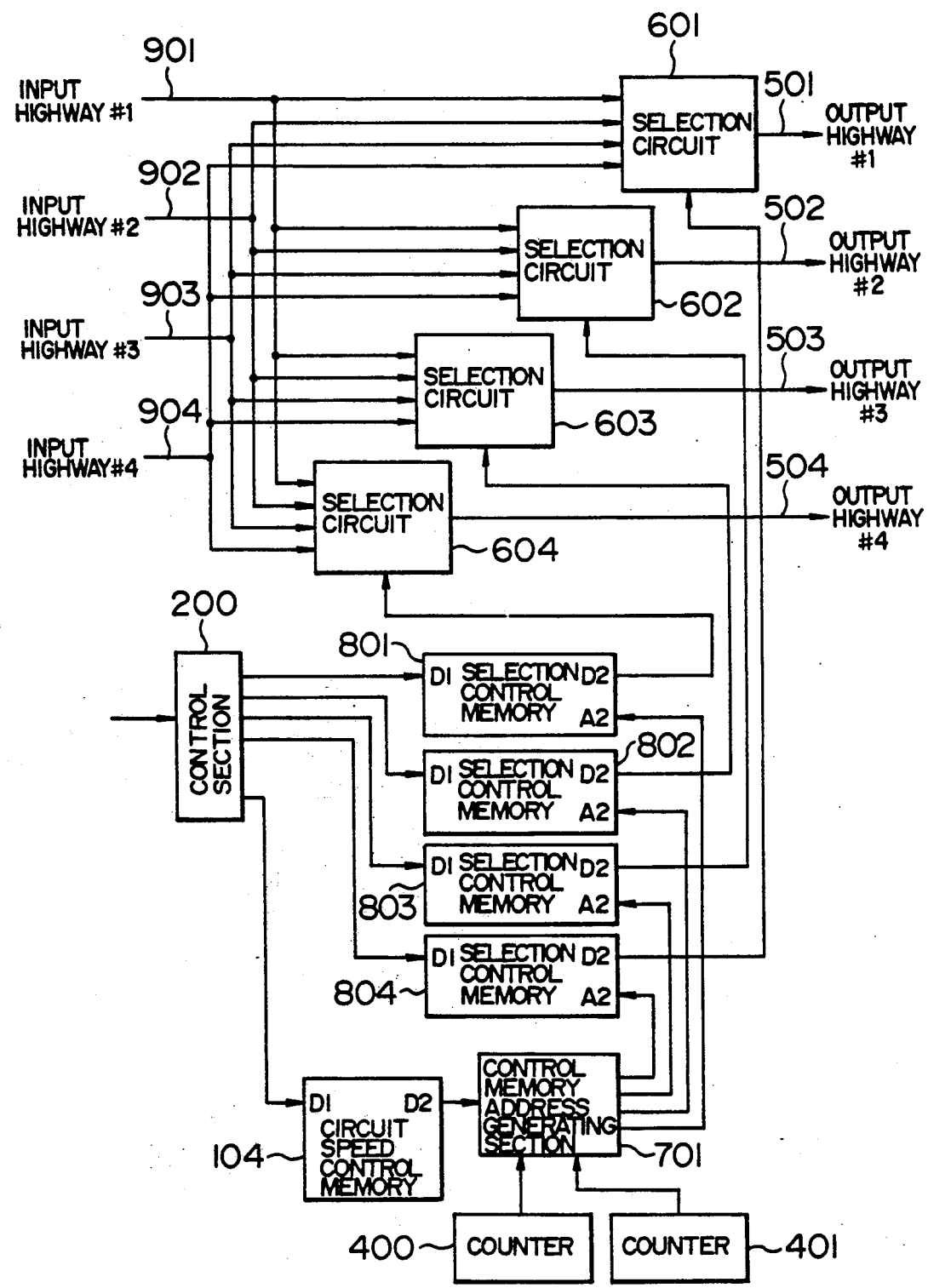
FIG. 14 is a block diagram showing an embodiment of the time division space switch appearing in FIG. 3 of the present invention.

Next, the configuration of a fifth embodiment of the present invention will be explained with reference to a block diagram shown in FIG. 14. The fifth embodiment corresponds to the time division space switch shown in FIG. 3 and comprises 4 input highways 901–904, a plurality of selection circuits 601–604 for selecting a particular circuit signal from the 4 input highways, a plurality of output highways 501–504 coupled to the respective selection circuits 601–604, selection control memories 801–804 provided in correspondence to the respective selection circuits 601–604 for storing control information for the selection circuits, a circuit speed control memory 104 for storing information on the circuit speed on the output highways 501–504, a control memory address generating section 701 for reading the selection circuit control information from the selection control memories 801-804 based on the speed information from the circuit speed control memory 104, and counters 400, 401 for generating addresses necessary to the apparatus.

The operation of the fifth embodiment will be next explained. The frame structure on the input highways 901-904 and the output highways 501-504 are similar to that of the first embodiment. In the circuit speed control memory 104, there is stored information representative of which of TU-21, TU-12 and TU-11 is included in each of TUG-21's on the respective output highways. In the selection control memories 801-804, there are stored the numbers of input highways which are to be outputted onto the respective output highways 501-504. The above control information is written into the circuit speed control memory 104 and the selection control memories 801-804 from the outside through a control section 200. Similar to the embodiment shown in FIG. 2, the counter 400 generates addresses for TU-11 and TU-21 while the counter 401 generates addresses for TU-12. From the circuit speed control memory 104, the TU class is read out at the cycle of TUG-21 in a time division manner and supplied to a control memory address generating section 701. The control memory address generating section 701 generates read addresses of the selection control memories 801-804 by selecting addresses from the counter 400 and addresses from the counter 401 on the basis of the TU class information from the circuit speed control memory 104, and supplies the same to the selection control memories 801-804. The read cycle of the selection control memories 801-804 are thereby changed in accordance with the TU class. The circuit switching information read out of the selection control memories 801-804 are delivered to the selection circuits 601-604 which respectively select one of the 4 input highways 901-904 on the basis of the circuit switching information.

By a combination of the time division space switch of the present embodiment and the time division time switch of the first embodiment enables a construction of a multiple stage switch having a large capacity.

A delay time occurring in the circuits due to a time division switching is coincident with a switching cycle. Therefore, if switching circuits with a plurality of speeds are switched by a conventional method, the delay time is equal to the most common divisor of the circuit speeds, which results in increasing the delay time. However, the present invention variably controls the switching cycle in a time division manner in accordance with a circuit speed by the use of a memory for storing the circuit speed, thereby making it possible to independently determine the switching cycle for each circuit speed and therefore perform a circuit switching with a short delay even in the case where circuits with a plurality of speeds are mixed. It is also possible to reduce the data memory capacity.

We claim:

1. A circuit switching method for time division multiplexed signals with various transmission speeds comprising the steps of:
   time-division multiplexing a plurality of input circuits including circuits with different transmission speeds, and transmitting the multiplexed signals through an input highway;
   repeatedly recording in a data memory in a predetermined order signals which have been transmitted onto said input highway during at least a two-block portion of a switching period of a signal on an input circuit with the lowest transmission speed of said plurality of input circuits;
   storing circuit transmission speed information relative to circuit transmission speeds of said plurality of input circuits;
   storing circuit switching information indicating output circuits to which said plurality of input circuits are to be respectively connected;
   reading signals out of said data memory in block units at each of said circuit transmission speeds on the basis of said circuit transmission speed information and said circuit switching information and delivering said signals onto the output highways; and
   delivering in order signals on said output highways to said plurality of output circuits;
   wherein said reading step comprises the steps of:
   determining a switching period for each of said respective circuit transmission speeds,
   generating an address for reading a signal indicative of a transmission speed corresponding to each time slot in a predetermined order, and
   reading signals stored in said data memory in accordance with said generated address onto said output highways.

2. A circuit switching method for time division multiplexed signals with various transmission speeds according to claim 1 wherein a circuit transmission speed of at least one of said input circuits is not an integer multiple of the circuit transmission speeds of the other input circuits.

3. A circuit switching method for time division multiplexed signals with various transmission speeds according to claim 2, wherein said circuits with non-integer multiple transmission speeds with each other are TU-11 and TU-12 described in CCITT Recommendation G. 709.

4. A circuit switching method for time division multiplexed signals with various transmission speeds according to claim 1, wherein said generating an address step comprises the steps of:
   counting pulses by each of a plurality of counters whose repeated maximum count value corresponds to each of said circuit transmission speeds;
   selecting one a count from one of said counters corresponding to each of the respective time slots on the basis of said circuit transmission speed information; and
   generating an address on the basis of said one count.

5. A space switch for time division multiplexed signals comprising:
   a plurality of input highways;
   a plurality of selection circuits for selecting particular circuits signals from said plurality of input highways;
   a plurality of output highways respectively coupled to said plurality of selection circuits;
   selection control memories provided for said plurality of respective selection circuits for storing control information for said selection circuits;
   a circuit transmission speed control memory for storing information on transmission speeds of the circuits transmitted through said plurality of output highways;
   a plurality of counters for generating counts whose maximum values correspond to switching periods of said transmission speeds respectively; and address generating section for generating addresses for reading said selection circuit control information from said selection control memories by selecting one of the counts from said counters based on said transmission speed information from said circuit transmission speed control memory.

6. A circuit switching apparatus for time division multiplexed signals with various transmission speeds comprising:
   a unit for time-division multiplexing a plurality of input circuits including circuits with different transmission speeds;
   input highways for transmitting signals time division multiplexed by said time division multiplexing unit;
   a data memory for repeatedly recording in a data memory in a predetermined order signals which have been transmitted onto said input highways during at least a two-block portion of a switching period of a signal on an input circuit with the lowest transmission speed of said plurality of input circuits;
   a circuit speed control memory for storing circuit transmission speed information relative to circuit transmission speeds of said plurality of input circuits;
   an address control memory for storing circuit switching information indicating output circuits to which said plurality of input circuits are to be respectively connected;
   means for reading out signals in block units from said data memory on the basis of said circuit transmission speed information and said circuit switching information;
   output highways for transmitting said read out signals; and
   a division unit for delivering in order signals on said output highways to said plurality of output circuits;
   wherein said read out means comprises:
   a plurality of counters for generating counts whose maximum values correspond to switching periods of said respective circuit transmission speeds,
   means for selecting one of the counts from said counters, and
   means for generating an address for reading signals on the basis of the count selected by said selecting means.

7. A circuit switching apparatus for time division multiplexed signals according to claim 6, wherein said data memory is a memory having an input port and an output port which are accessible independently of each other.

8. A circuit switching apparatus for time division multiplexed signals according to claim 6, wherein the capacity of said data memory is a capacity equal to the least common multiple of data amounts corresponding to switching periods of circuits on the input highways or a capacity equal to said least common multiple with a capacity corresponding to an overhead.

9. A circuit switching apparatus for time division multiplexed signals according to claim 6, wherein data on said input highways is written into said data memory sequentially from the head address, and a read onto said output highways is started from the latest switching block in which a write has been completed in accordance with instructions from said circuit speed control memory and said address control memory after a capacity corresponding to the switching period of the circuit having the lowest transmission speed has been written.

* * * * *